United States Patent [19]

Helm et al.

[11] 4,249,791
[45] Feb. 10, 1981

[54] OPTICAL SCANNING SYSTEM USING FOLDING MIRRORS AND WITH STABILIZATION

[75] Inventors: David P. Helm, Burke; William S. Flogaus, Alexandria, both of Va.

[73] Assignee: The United States of America as represented by the Secreatry of the Army, Washington, D.C.

[21] Appl. No.: 18,380

[22] Filed: Mar. 7, 1979

[51] Int. Cl.³ .............................................. G02B 23/00
[52] U.S. Cl. ......................................... 350/16; 350/24
[58] Field of Search ..................... 350/16, 22, 24, 25, 350/26

[56] References Cited

U.S. PATENT DOCUMENTS

| | | | |
|---|---|---|---|
| 3,423,145 | 1/1969 | Breitengross | 350/24 |
| 4,123,134 | 9/1978 | Meyers | 350/16 X |
| 4,155,621 | 5/1979 | Mead | 350/16 |

Primary Examiner—John K. Corbin
Assistant Examiner—Matthew W. Koren
Attorney, Agent, or Firm—Nathan Edelberg; Milton W. Lee; Aubrey J. Dunn

[57] ABSTRACT

An objective with two lens elements has a first fully-reflective plane mirror between the lens elements, and a second such mirror between the objective and a detector. The outermost lens element and the first mirror are carried in a housing rotatable with respect to another housing carrying the other lens elements and the second mirror. The other housing is rotatable about an axis between the second mirror and the detector. The system may thus do elevation scanning by rotating the first housing, and azimuth scanning by rotating the two housings about the mentioned axis. Image stabilization is accomplished by appropriately stabilizing one or both mirrors.

5 Claims, 3 Drawing Figures

OPTICAL SCANNING SYSTEM USING FOLDING MIRRORS AND WITH STABILIZATION

The invention described herein may be manufactured, used, and licensed by the U.S. Government for governmental purposes without the payment of any royalties thereon.

BACKGROUND OF THE INVENTION

This invention is in the field of remotely controlled optical systems capable of scanning some object space. Such systems include infrared detectors and television cameras. Various schemes are known for scanning with such systems and involve either physically moving an entire system, such as with turrets or gimballed housings, or moving some reflective elements of a system, such as a mirror (or mirrors) in front of the system objective lens, or between the objective and the detector of the system. In the cases wherein large objectives are used, all of the schemes suffer from such disadvantages as being heavy and requiring large and expensive bearings. Moreover, large torque motors and substantial power are required to slew such heavy systems. Another problem also arises when any such systems are carried on vehicles such as helicopters or tanks. This problem is image stabilization and arises from vehicle vibration. Our invention is able to overcome the disadvantages mentioned above by employing mirrors, one between objective lens elements and another between objective and detector. Also, one or both of such mirrors may be stabilized.

SUMMARY OF THE INVENTION

The invention is an optical system with an objective having separated lens elements and a detector for an image. The optical path of the system is folded by two mirrors; one between the lens elements and the other between the objective and the detector. An object space can be scanned in one dimension by pivoting the outermost (nearest the object) lens elements and the mirror between the lens elements about an axis between the mirrors and in another dimension by pivoting the other lens element and the other mirror about an axis between the other mirror and the detector. Image stabilization may be accomplished with one or the other or both of the mirrors.

DESCRIPTION OF THE PREFERRED EMBODIMENT

Figure 1:
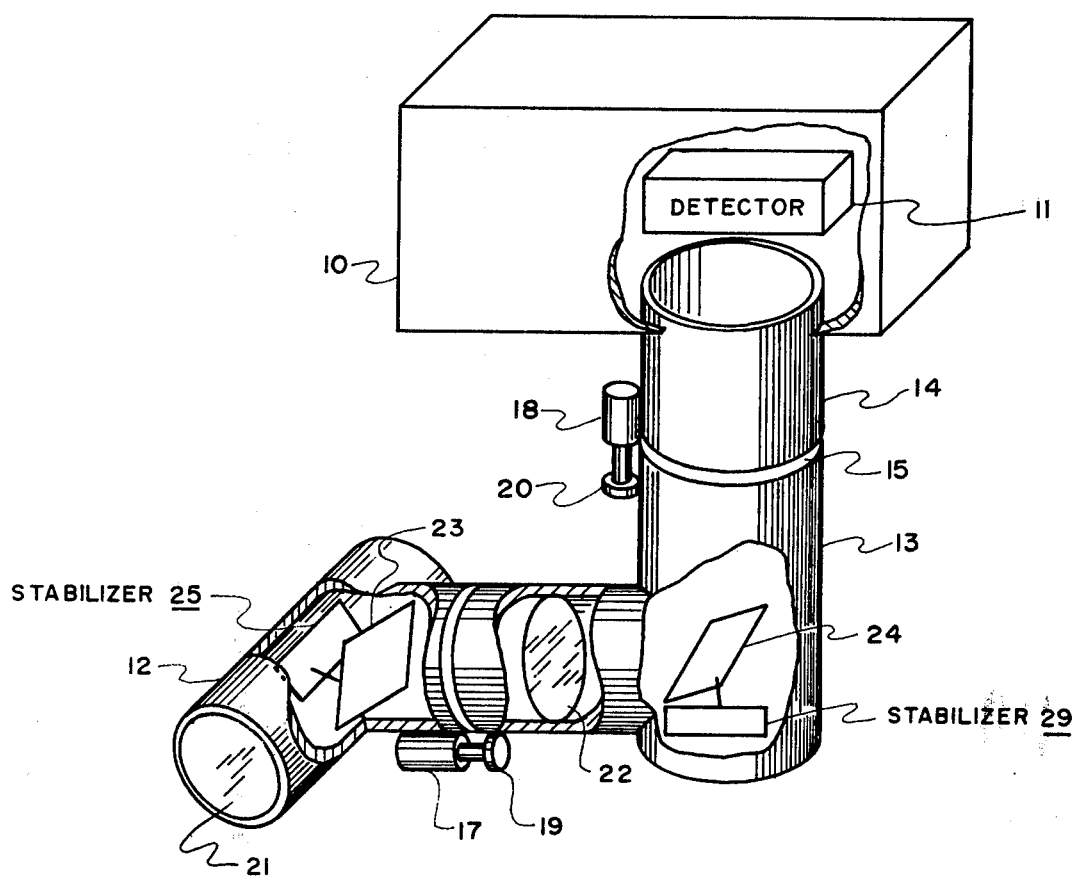
FIG. 1 is a schematic diagram of one embodiment of the invention.

The embodiment of FIG. 1 includes platform 10 containing detector 11. Suspended from 10 is an articulated optical head including housings 12 and 13. Housing 13 is pivotably supported on platform extension 14 by bearing 15. Housing 12 is pivotably supported on housing 13 by bearing 16. Electrical torque motors 17 and 18 are respectively mounted on housing 12 and extension 14 and will impart (when energized) rotation to respective housings 12 and 13 through respective friction wheels 19 and 20. The optical system of the invention includes an objective with first and second refractive lens elements 21 and 22 respectively carried by housings 12 and 13, and first and second fully-reflective planar mirrors 23 and 24 respectively carried by housing 12 and 13. All of elements 10-24 thus far described are common to all embodiments of the invention. These elements comprise an optical system capable of scanning most of the space about platform 10. It should be understood that platform 10 is mounted on a vehicle, and that 10 contains (or obtains from the vehicle) the necessary electrical power for torque motors 17 and 19, for detector 11, and for other electrical elements of the invention yet to be described. Mirror 23 is positioned to reflect light gathered by lens 21 toward lens 22. Such light passes through lens 23 and is reflected by mirror 24 to detector 11. All embodiments of the invention operate in this manner. The difference between the embodiments is the means whereby image stabilization may be obtained. In FIG. 1 stabilization is obtained for two axes of motion (elevation and azimuth) by stabilizing both mirrors 23 and 24 relative to their respective housings. Mirror 23 is stabilized by stabilizer 25. This stabilizer may take any one of various forms. The most simple form is merely a vibration damper or shock-absorbing mount between mirror 23 and housing 12. More complex forms includes such things as a gyro gimballed with a single degree of freedom to housing 12 and hard-mounted to 23. In any case, mirror 23 is supported for stabilization by 25 about the segment of the optical axis of the invention between the mirrors and provides elevation stabilization. In a similar manner, mirror 24 is stabilized about the segment of the optical axis between 24 and detector 11 by stabilizer 29 and provide azimuth stabilization.

Figure 2:
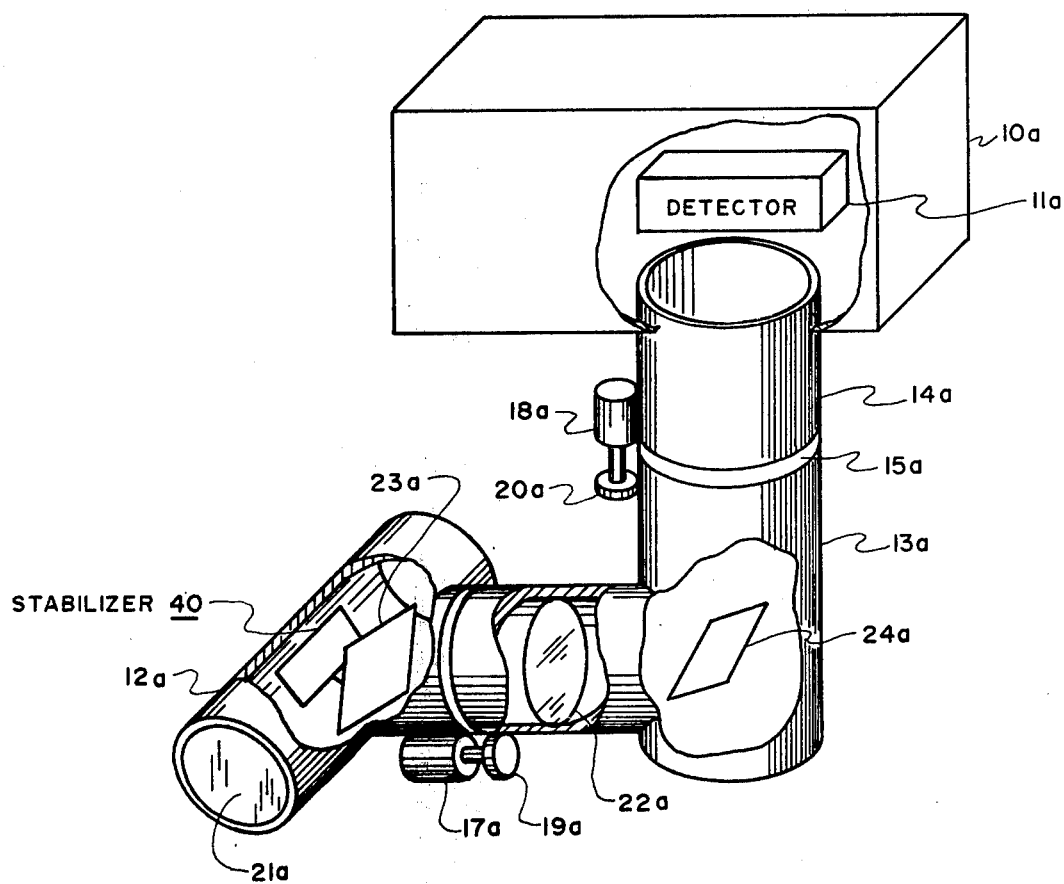
FIG. 2 is a schematic diagram of another embodiment of the invention.

FIG. 2 shows an embodiment similar to FIG. 1 and uses similar reference characters, except as to the actual stabilization means. In FIG. 2, both elevation and azimuth stabilization are carried out on single mirror 23a. Again, as in the case of FIG. 1 the most simple form of stabilizer 40 need be only a vibration damper or shock-absorbing mount between mirror 23a and housing 12a. A more complex form may have mirror 23a hard-mounted to a gyro gimballed with two degrees-of-freedom to housing 12a. Stabilizer 40 is thus able to provide both elevation and azimuth stabilization for mirror 23a.

Figure 3:
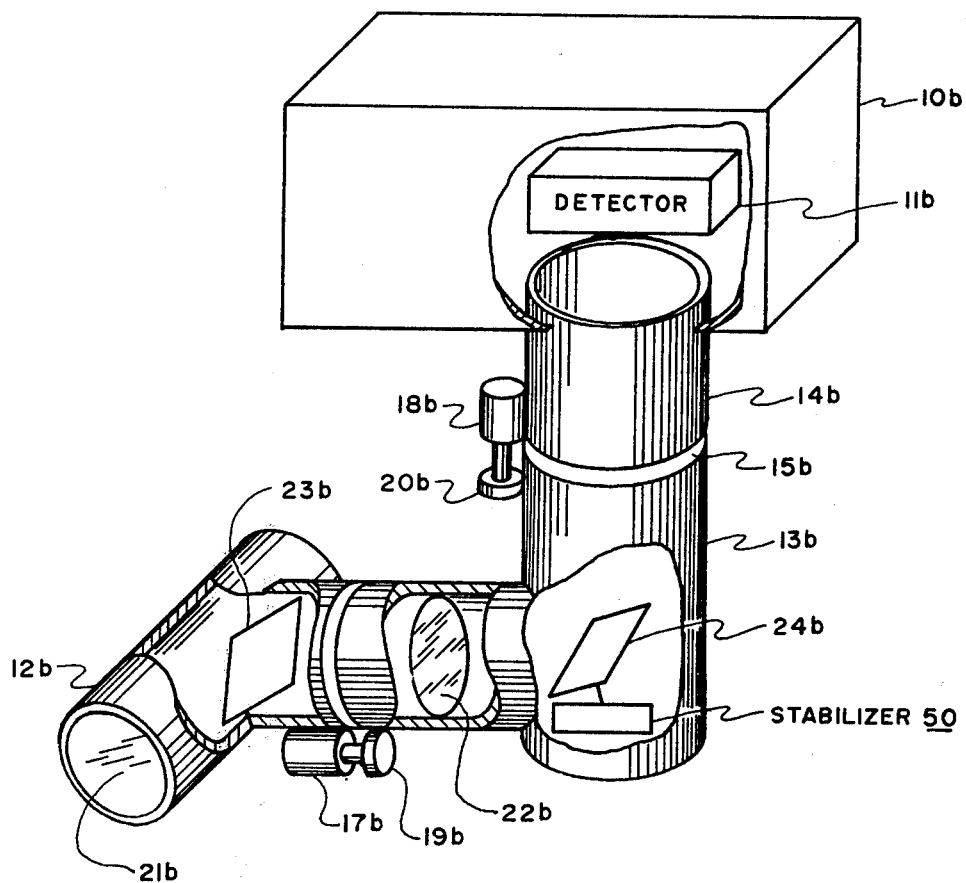
FIG. 3 is a schematic diagram of yet another embodiment of the invention.

The FIG. 3 embodiment is similar in most aspects to the other embodiments, but stabilization is performed on single mirror 24b. In this embodiment, stabilizer 50 may take the simple vibration damper or shock-absorbing mount form or the more complex two degrees-of-freedom gyro as for stabilizer 40 of FIG. 2.

Although specific embodiments of the invention have been described and schematically shown, other embodiments may be obvious to one skilled in the art, in light of this patent disclosure. For example, the various housing torquers such as 17 and 18 may take other shapes than those shown, or may be mounted internal to the housings. Moreover, gear, belt or chain drives may be used between the torquers and the housings. Obviously, the various lens elements, such as 21 and 22 may be compound, or with a slightly different optical system, may be reflective rather than refractive lenses. Further, power for the various stabilizers, if needed, may be provided from platform 10, or 10a or 10b.

We claim:

1. An optical scanning and stabilization system having a detector for an image and having an optical axis and including:

an objective with at least first and second lens elements on said axis;
a first fully reflective plane mirror on said axis between said lens elements, the plane of the mirror being non-perpendicular to said axis;
a second fully reflective plane mirror on said axis between said objective and said detector, the plane of said second mirror being non-perpendicular to said axis and non-parallel to the plane of said first mirror, wherein said optical axis includes a first segment between the center of said first mirror and the center of said second mirror and a second segment between the center of said second mirror and said detector;
a first housing surrounding and supporting said first lens element and said first mirror;
a second housing surrounding and supporting said second lens element and said second mirror;
means for pivotably supporting said first housing on said second housing whereby said first housing is rotatable about said first axis segment;
means for pivotably supporting said second housing with respect to said detector whereby said second housing is rotatable about said second axis segment; and
further including means for stabilizing at least one of said mirrors to provide stabilization of an image on said detector.

2. The system as recited in claim 1 wherein said means for stabilizing operates on only one of said mirrors.

3. The system as recited in claim 2 wherein said first mirror is the only one mirror.

4. The system as recited in claim 2 wherein said second mirror is the only one mirror.

5. The system as recited in claim 1 wherein said means for stabilizing operates on both of said mirrors.

* * * * *